US011639882B2

(12) United States Patent
Hao et al.

(10) Patent No.: US 11,639,882 B2
(45) Date of Patent: May 2, 2023

(54) METHOD AND SYSTEM FOR DETECTING EXHAUST EMISSIONS OF VEHICLE EQUIPPED WITH IGNITION ENGINE BASED ON BIG DATA OF REMOTE SENSING

(71) Applicant: BEIJING INSTITUTE OF TECHNOLOGY, Beijing (CN)

(72) Inventors: Lijun Hao, Beijing (CN); Zihao Ge, Beijing (CN); Hang Yin, Beijing (CN); Junfang Wang, Beijing (CN); Xiaohu Wang, Beijing (CN); Jia Liu, Beijing (CN); Jin Liu, Beijing (CN); Yunjing Wang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 113 days.

(21) Appl. No.: 17/178,569

(22) Filed: Feb. 18, 2021

(65) Prior Publication Data
US 2022/0057297 A1    Feb. 24, 2022

(30) Foreign Application Priority Data

Aug. 18, 2020   (CN) .......................... 202010831651.0

(51) Int. Cl.
*G01M 15/10*       (2006.01)
(52) U.S. Cl.
CPC ................... *G01M 15/108* (2013.01)
(58) Field of Classification Search
CPC .......... G01N 2021/1793; G01N 21/17; G01M 15/108; G01C 21/3492; G01C 21/3469; G06F 17/11; G06F 17/18; G01D 21/02; G06V 20/00; G06V 20/625; G06V 2201/08
See application file for complete search history.

(56) References Cited

PUBLICATIONS

Real-world emissions of gasoline passenger cars in Macao and their correlation with driving conditions Wang, Z.; Wu, Y.; Zhou, Y.; Li, Z.; Wang, Y.; et al. International Journal of Environmental Science and Technology11.4: 1135-46. Springer Berlin. (May 2014) (Year: 2014).*

(Continued)

*Primary Examiner* — Eric S. McCall
*Assistant Examiner* — Timothy P Graves

(57) ABSTRACT

The present disclosure provides a method and system for detecting exhaust emissions of a vehicle equipped with an ignition engine based on big data of remote sensing. The system includes: a vehicle emission measuring instrument, a host computer, an information display instrument, a vehicle driving state tester, a weather monitor, a license plate camera and a vehicle emission monitoring platform. The vehicle emission measuring instrument, the information display instrument, the vehicle driving state tester, the weather monitor and the license plate camera communicate with the host computer. The host computer is connected to the vehicle emission monitoring platform via the Internet. The present disclosure acquires pollutant concentrations in the vehicle emissions through the detection system, divides a vehicle specific power (VSP) into multiple bins, performs statistical analysis and evaluation on the vehicle emissions according to different vehicle types, and determines high-emission vehicles.

18 Claims, 3 Drawing Sheets

(56) References Cited

PUBLICATIONS

WaybackMachine image of EPA Vehicle Weight Classifications, 2015, https://web.archive.org/web/20150930053933/http://www3.epa.gov/otaq/standards/weights.htm (Year: 2015).*

* cited by examiner

METHOD AND SYSTEM FOR DETECTING EXHAUST EMISSIONS OF VEHICLE EQUIPPED WITH IGNITION ENGINE BASED ON BIG DATA OF REMOTE SENSING

TECHNICAL FIELD

The present disclosure relates to the technical field of vehicle exhaust detection, in particular to a method and system for detecting exhaust emissions of a vehicle equipped with an ignition engine based on big data of remote sensing.

BACKGROUND

At present, the regular inspection for the exhaust emissions of vehicles equipped with ignition engines in use in China mainly adopts the acceleration simulation mode (ASM) or the vehicle mass analysis system (VMAS). When the detection conditions are not met, especially during road inspections, the two-speed idle (SPI) test may be used. The operation of the test equipment is very simple, but due to the limitations of the equipment, the vehicle is stationary during detection, which is not the normal driving condition of the vehicle. Therefore, there will be a large error compared to the actual driving emissions. The annual inspection cycle of in-use vehicles is generally once a year, and new vehicles are exempt from inspection for six years. This does not guarantee that vehicles always meet the emission standards during two statutory annual inspections. Remote sensing test can be used to realize the purpose of real-time vehicle emissions monitoring.

The remote sensing detection technology for motor vehicle exhaust pollutants features fast detection, which can detect thousands of vehicles in one hour, saving time and effort, and greatly improving the efficiency of vehicle emission detection. The remote sensing monitoring can be completed during the normal driving of the vehicle. The operating conditions of the vehicle engine during monitoring are more representative, and better reflect the actual vehicle emissions than the traditional contact measurement method. The vehicle emission remote sensing test can be carried out without the driver's knowledge, avoiding that individual drivers take measures to artificially affect the test results in order to pass the test.

The vehicle emission remote sensing testing technology has been practically applied in some countries and regions in North America, Europe and Asia. At present, it mainly focuses on screening high-emission vehicles, screening clean vehicles and carrying out vehicle emission inspections at city road entrance, etc.

In order to improve air quality, the elimination of yellow-label vehicles and old vehicles is sped up in the field of transportation. Article 53 of the *Law of the People's Republic of China on the Prevention and Control of Atmospheric Pollution Air* (latest edition) issued in 2015 clearly stipulates: under the condition that normal traffic is not affected, remote sensing monitoring and other technical means may be used to supervise and sample the air pollutant emission status of motor vehicles driving on the road.

As of the end of 2016, more than 70 cities in China have applied emission remote sensing monitoring equipment to carry out on-road vehicle emission detection. More than 400 sets of remote sensing monitoring equipment for motor vehicle emissions have been built nationwide, including more than 150 sets of fixed remote sensing monitoring equipment and more than 250 sets of mobile remote sensing monitoring equipment. According to China's remote sensing detection network planning, there are about 350 cities in the country that need to install remote sensing detection equipment, and each city needs at least 10 remote sensing detection equipment, so at least 3500 sets of remote sensing detection equipment are needed nationwide. The remote sensing monitoring data of motor vehicle emissions will increase explosively. The big remote sensing data of motor vehicle emissions can be processed to realize nationwide networked monitoring of motor vehicles.

At present, the remote sensing detection method for the exhaust emissions of vehicles equipped with ignition engines is to determine the validity of vehicle emission remote sensing test data in the selected vehicle specific power (VSP) determination interval so as to screen high-emission vehicles. For example, the United States Environmental Protection Agency (US EPA) recommends a VSP of 0-20 kW/ton as the determination interval for the validity of the remote sensing results of light-duty vehicles, and remote sensing data beyond this range will not be used for subsequent evaluation. Relevant studies in China have shown that the emission concentrations of CO, HC and $NO_x$ are relatively stable when the VSP is in the range of −5 kW/ton to 14 kW/ton, so this range is used as the determination interval for the validity of the remote sensing results.

In fact, this method is equivalent to setting only one VSP bin for the determination interval of the vehicle emission remote sensing data and only specifying one limit, without taking into account the characteristics of motor vehicle emissions that vary with VSP. Therefore, this method can easily lead to misjudgment and is not conducive to scientific and refined management. Since only a limited VSP range is selected for the validity of vehicle remote sensing data and remote sensing data beyond this range will not be used for subsequent evaluation, a large amount of invalid remote sensing data are resulted. Tests have found that emissions outside the selected VSP determination interval for validity are more serious, so this part of data should be included in the scope of supervision.

Therefore, it is an urgent problem for those skilled in the art to include the emission data outside the selected VSP determination interval for validity in the scope of supervision, and to detect the exhaust emissions of vehicles equipped with ignition engines based on big data of remote sensing.

SUMMARY

In view of this, the present disclosure provides a method and system for detecting exhaust emissions of a vehicle equipped with an ignition engine based on big data of remote sensing. The present disclosure acquires pollutant concentrations in the vehicle emissions through the detection system, divides a vehicle specific power (VSP) into multiple bins, evaluates the vehicle emissions according to different vehicle types, and determines high-emission vehicles.

To achieve the above objective, the present disclosure adopts the following technical solutions:

A method for detecting exhaust emissions of a vehicle equipped with an ignition engine based on big data of remote sensing, including:

S1: performing remote sensing detection on gaseous exhaust pollutants of a vehicle;

S2: calculating a VSP and dividing the VSP into bins;

S3: performing statistical analysis on exhaust pollutant data in each bin divided in S2 according to exhaust pollutant data obtained in S1 and information of bins divided in S2;

S4: calculating an average emission level of the vehicle; and

S5: determining a high-emission vehicle.

Preferably, the performing remote sensing detection on gaseous exhaust pollutants of a vehicle in S1 includes:

1) detecting relative volume concentration ratios of CO, HC and NO to $CO_2$ in an exhaust plume respectively, that is, $CO/CO_2$, $HC/CO_2$ and $NO/CO_2$, or $\phi_{CO}$, $\phi_{HC}$ and $\phi_{NO}$:

$$\phi_{CO} = \frac{C_{CO}}{C_{CO_2}} \qquad (1)$$

$$\phi_{HC} = \frac{C_{HC}}{C_{CO_2}} \qquad (2)$$

$$\phi_{NO} = \frac{C_{NO}}{C_{CO_2}} \qquad (3)$$

where, $\phi_{CO}$, $\phi_{HC}$ and $\phi_{NO}$ represent the relative volume concentration ratios of CO, HC and NO to $CO_2$ respectively; $C_{CO}$, $C_{HC}$, $C_{NO}$ and $C_{CO_2}$ represent concentrations of CO, HC, $NO_x$ and $CO_2$ in the exhaust plume respectively;

2) calculating an emission of pollutant P per unit mass of fuel consumed by the vehicle, that is, an emission factor per mass by using a carbon balance method according to the relative volume concentration ratios of each component in the exhaust plume calculated in 1):

$$EF_P = \frac{M_P}{M_{fuel}} * \frac{\phi_P}{1 + \phi_{CO} + 6*\phi_{HC}} [g/\text{kg fuel}] \qquad (4)$$

where, P represents CO, HC and NO; $M_p$ and $M_{fuel}$ represent a molecular weight of pollutant P and fuel respectively, in g/mole;

3) calculating volume percent concentrations of $CO_2$, CO, HC and NO in the exhaust plume of the vehicle according to the relative volume concentration ratios of each component in the exhaust plume calculated in 1):

$$EC_{CO2} = \frac{42}{2.79 + 2\phi_{CO} + 1.21\phi_{HC} + \phi_{NO}} \qquad (5)$$

$$EC_{CO} = EC_{CO_2} * \phi_{CO} \qquad (6)$$

$$EC_{HC} = EC_{CO_2} * \phi_{HC} \qquad (7)$$

$$EC_{NO} = EC_{CO_2} * \phi_{NO} \qquad (8)$$

Preferably, based on a volume of emission remote sensing data and a need for refined management, vehicles equipped with ignition engines are classified into light-duty vehicles, medium-duty vehicles and heavy-duty vehicles according to a gross vehicle mass (GVM), and are further classified into light-duty passenger vehicles, light-duty trucks, medium-duty passenger vehicles, medium-duty trucks, heavy-duty passenger vehicles and heavy-duty trucks according to their uses.

Preferably, the calculating a VSP and dividing the VSP into bins in S2 specifically includes: calculating a VSP:

$$VSP = \left[\frac{C_D A_f}{m_v} \frac{\rho_a}{2}(v \pm v_w)^2 + gC_R \cos\varphi + a(1 + \varepsilon_i) + g\sin\varphi\right]v \qquad (9)$$

where, $C_D$ represents a drag coefficient; $A_f$ represents a frontal area of the vehicle; $\rho_a$ represents an air density; v represents a vehicle speed; $v^w$ represents a wind speed; g represents an acceleration due to gravity; $C_R$ represents a rolling resistance coefficient of a tire; a represents a vehicle acceleration; $\varepsilon_i$ represents a mass conversion coefficient of a rotating part of a powertrain; φ represents a road gradient; $m_v$ represents a vehicle mass;

dividing a driving cycle of each type of vehicles into i+j intervals using the VSP as a parameter, where there are i intervals in a range where the VSP is positive, which are respectively defined as $Bin_{p1}$, $Bin_{p2}$, 、、、, $Bin_{pi-1}$, $Bin_{pi}$; there are j intervals in a range where the VSP is negative, which are defined as $Bin_{n1}$, $Bin_{n2}$, 、、、, $Bin_{ni-1}$, $Bin_{ni}$; each bin represents a VSP range in which the vehicle is traveling.

Preferably, the performing statistical analysis specifically includes:

S31: detecting a vehicle speed and acceleration by a vehicle driving state tester, calculating the VSP of the tested vehicle under a test cycle by Eq. (9), and allocating vehicle emission remote sensing test data to a corresponding bin according to the VSP; and S32: processing the vehicle emission remote sensing test data in each VSP bin by using a probability distribution method for a discrete random variable:

taking the vehicle remote sensing emission data as a discrete random variable x, letting $x_1, x_2, \ldots, x_n$ be values of the remote sensing emission data variable x and $p_1, p_2, \ldots, p_n$ be probabilities corresponding to these values, which indicate a probability distribution density, where, the probability distribution of discrete remote sensing detection data $x_i$ may be expressed as:

$$P(x_i) = p_i \qquad (10)$$

where i=1, 2, . . . , n,
probability $p_i$ satisfies:

$$\Sigma_{i=1}^{n} p_i = 1 \qquad (11)$$

deriving a cumulative distribution probability of the discrete emission data variable x by a cumulative distribution function $f(x)$:

$$f(x_i) = \Sigma_1^i p_i \qquad (12)$$

calculating a probability of a value of the discrete emission data variable x that falls within [a,b]:

$$P(a < x \leq b) = f(b) - f(a) \qquad (13).$$

The values of the emission data variable $x_i$ are greater than or equal to 0, and a cumulative distribution probability curve of the probability distribution function $f(x)$ of the emission data variable x is thus obtained. The emission data variable $x_i$ is regarded as coordinates of random points on a coordinate axis, and values of cumulative distribution probability function $f(x_i)$ represent the probabilities of x falling in the interval $(0 \sim x_i)$. If a proportion of high-emission vehicles is set at y %, an emission measurement value with a cumulative distribution probability of (100−y) % is taken as an initial emission limit or an emission determination threshold for screening high-emission vehicles.

Preferably, the average emission level of the vehicle is calculated by:

$$\bar{x} = \Sigma_{i=1}^{n} x_i p_i \qquad (14).$$

Preferably, the determining a high-emission vehicle includes:

recording a tested vehicle as one exceeding an emission limit if a remote sensing emission test result of the tested vehicle exceeds a high-emission determination threshold in a bin, and recording the tested vehicle as a high-emission vehicle if the number of the vehicle's excess emission records reaches a determination number within a specified time period.

A system for detecting exhaust emissions of a vehicle equipped with an ignition engine based on big data of remote sensing, including: a vehicle emission measuring instrument, a host computer, an information display instrument, a vehicle driving state tester, a weather monitor, a license plate camera and a vehicle emission monitoring platform, where the vehicle emission measuring instrument, the information display instrument, the vehicle driving state tester, the weather monitor and the license plate camera communicate with the host computer; the host computer is connected to the vehicle emission monitoring platform via the Internet;

the host computer (2) is used to process data acquired by the vehicle emission measuring instrument (1), the vehicle driving state tester (4), the weather monitor (5) and the license plate camera (6).

Preferably, the vehicle emission measuring instrument adopts a vertical or horizontal optical path and is disposed in a passing area of a vehicle;

the vehicle emission measuring instrument includes a detection light emitting device, a detection light receiving device and a detection light reflecting device; the detection light emitting device and the detection light receiving device are arranged oppositely; the detection light emitting device is used to emit detection light to pass through an exhaust plume; the detection light receiving device is used to receive the detection light passing through the exhaust plume;

the vehicle driving state tester is an optical or radar measuring instrument for vehicle speed and acceleration.

Preferably, the information display instrument is a high-brightness lattice screen, which is used to display relevant information of a tested vehicle in real time, including license plate number, vehicle speed and exhaust pollutant concentration;

the weather monitor is a miniature weather station, which is disposed in the passing area of the vehicle and is used to measure environmental parameters.

According to the above technical solutions, the present disclosure provides a method and system for monitoring exhaust emissions of a vehicle equipped with an ignition engine based on big data of remote sensing. Compared with the prior art, the present disclosure acquires pollutant concentrations in the vehicle emissions through the detection system, divides a VSP into multiple bins, evaluates the vehicle emissions according to different vehicle types, and determines high-emission vehicles.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other examples obtained by a person of ordinary skill in the art based on the embodiments of the present disclosure without creative efforts should fall within the protection scope of the present disclosure.

Figure 1:
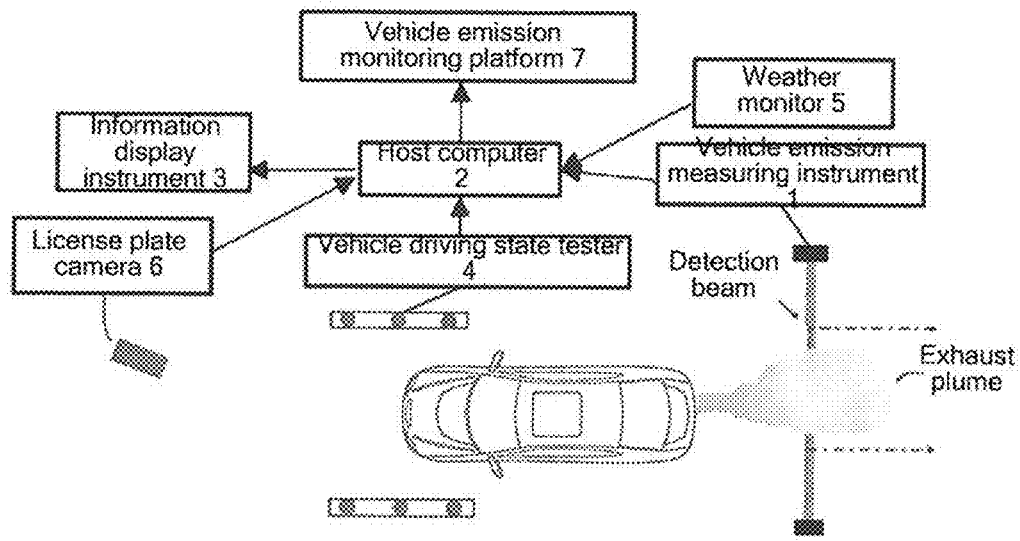
FIG. 1 is a structural diagram of a system provided by the present disclosure.

The embodiments of the present disclosure provide a method and system for detecting exhaust emissions of a vehicle equipped with an ignition engine based on big data of remote sensing. FIG. 1 shows a system for detecting exhaust emissions of a vehicle equipped with an ignition engine based on big data of remote sensing according to an embodiment of the present disclosure. The system includes: a vehicle emission measuring instrument, a host computer, an information display instrument, a vehicle driving state tester, a weather monitor and a license plate camera.

The vehicle emission measuring instrument, the information display instrument, the vehicle driving state tester, the weather monitor and the license plate camera communicate with the host computer. The host computer is connected to a vehicle emission monitoring platform via the Internet.

The vehicle driving state tester is an optical or radar measuring instrument for vehicle speed and acceleration. The vehicle driving state monitor is disposed beside a road in a vehicle detection area and is able to accurately measure the speed and acceleration of a tested vehicle when the vehicle passes by. The vehicle emission measuring instrument adopts a vertical or horizontal optical path and is disposed in a passing area of the vehicle. The vehicle emission measuring instrument includes a detection light emitting device and a detection light receiving device which are arranged oppositely. The detection light emitting device is used to emit detection light. The detection light receiving device is used to receive the detection light passing through an exhaust plume and analyze pollutant concentrations in the exhaust plume of the vehicle based on an intensity of the received detection light.

The information display instrument is a high-brightness lattice screen, which is able to display information of the tested vehicle in real time, including information such as license plate number, vehicle speed and exhaust pollutant concentration. The weather monitor is a miniature weather station, which is also disposed in the passing area of the vehicle and is able to accurately measure environmental parameters, such as wind speed, wind direction, temperature, humidity and other information.

The license plate camera is a high-speed camera, which is able to accurately capture license plate information. The license plate camera may also be other image recognition equipment that can obtain license plate information, which is not limited in the present disclosure. The host computer is an industrial control computer, which is responsible for acquiring and processing all the above input and output signals and system calibration, completing calculations of vehicle speed, acceleration, VSP and exhaust emissions, sending data to the vehicle emission monitoring platform via the Internet, and communicating with the vehicle emission monitoring platform.

The vehicle emission monitoring platform is responsible for statistical analysis of the big data of emission remote sensing detection, and a big data processing system continues to screen out a certain proportion of high-emission vehicles. Meanwhile, regular statistical analysis is carried out on the excess emission records, screening out a vehicle type with a high proportion of excess emission records. Spot check and supervision of emissions are focused on high-emission vehicles.

In this embodiment, the vehicle driving state tester measures the speed and acceleration of the vehicle equipped with an ignition engine, and the host computer uses the vehicle speed and acceleration as parameters to calculate the VSP. The vehicle emission measuring instrument detects the emission concentration ratios of CO, HC and NO to $CO_2$ in the exhaust plume, and calculates the emissions of CO, HC and NO per unit mass of fuel (g/kg fuel) according to a carbon balance equation. The emission concentrations of CO, HC, NO and $CO_2$ in the vehicle exhaust are calculated through inversion of the remote sensing data to realize real-time measurement of gas emissions in the vehicle exhaust.

An embodiment of the present disclosure further provides a method for detecting exhaust emissions of a vehicle equipped with an ignition engine based on big data of remote sensing.

VSP represents an instantaneous power per unit mass of a vehicle. It is an important parameter to characterize the remote sensing conditions of vehicle emissions. It is used to determine the stable range of exhaust emissions of the vehicle equipped with an ignition engine and determine the validity of the remote sensing data. In the United States, the Federal Test Procedure (FTP) emission test cycle was conducted on a vehicle test bench, and it was found that in the range of 0≤VSP≤20 kW/ton, the emission concentration of CO was stable, and in the range of VSP>20 kW/ton, the concentrations of CO and HC were prone to abnormally high values. Therefore, the United States Environmental Protection Agency (US EPA) recommends the VSP range of 0-20 kW/ton as the determination interval for the validity of vehicle emission remote sensing results, and remote sensing data beyond this range will not be used for subsequent evaluation. In China, Beijing uses the VSP range of 3-22 kW/ton as the interval for determining the validity of remote sensing results. In fact, this method is equivalent to setting only one VSP bin for the determination interval of the vehicle emission remote sensing data and generally only specifying one emission limit, without taking into account the characteristics of vehicle emissions that vary with VSP. Therefore, this method can easily lead to misjudgment and is not conducive to scientific and refined management. Since the VSP determination interval for the validity of vehicle remote sensing data is merely a limited VSP range and remote sensing data beyond this range will not be used for subsequent evaluation, a large amount of invalid remote sensing data are resulted, and the effectiveness of the remote sensing test equipment for motor vehicle emissions is reduced. In addition, it was found that emissions outside the VSP determination interval for the validity of remote sensing data are more serious, so this part of data should be included in the scope of detection and supervision.

Figure 2:
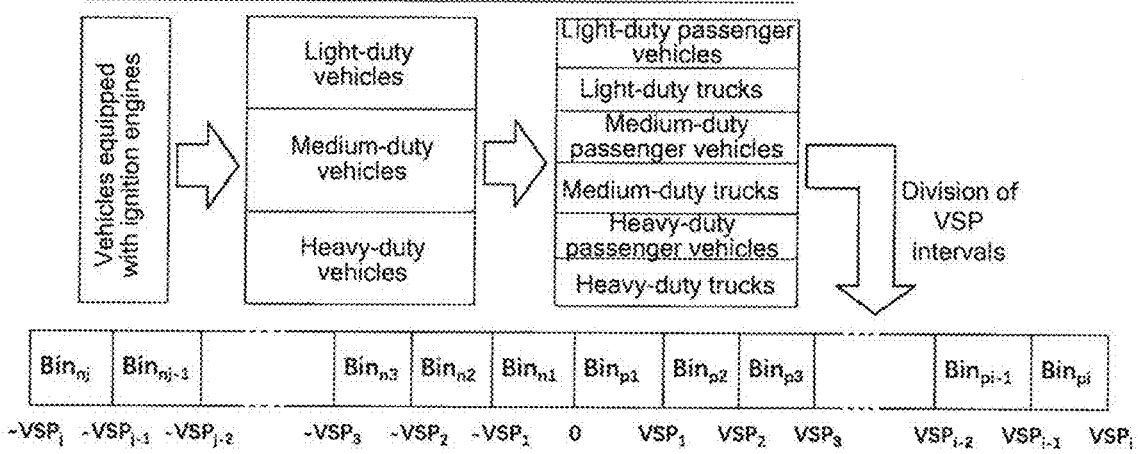
FIG. 2 shows a schematic diagram of classification of vehicle types and division of different bins of a vehicle specific power (VSP) of each vehicle type according to the present disclosure.

The present disclosure proposes a method for detecting exhaust emissions of a vehicle equipped with an ignition engine based on big data of remote sensing. According to the different emission characteristics of vehicles equipped with ignition engines under different VSP ranges, this monitoring method achieves the scientific and refined management of vehicle emissions by classifying the vehicles into different types and dividing different VSP bins. Specifically, this method includes steps S101 to S111:

S101: Classify vehicles equipped with ignition engines into different types based on a volume of vehicle emission remote sensing test data and a need for refined management, as shown in FIG. 2. The vehicles equipped with ignition engines may be classified into light-duty vehicles, medium-duty vehicles and heavy-duty vehicles, and may be further classified into light-duty passenger vehicles, light-duty trucks, medium-duty passenger vehicles, medium-duty trucks, heavy-duty passenger vehicles and heavy-duty trucks.

S102: Divide a driving cycle of each type of vehicles equipped with ignition engines into i+j intervals using VSP as a parameter according to the refined management need of the remote sensing emission data, where there are i intervals in a range where the VSP is positive (represented by subscript p), which are respectively defined as $Bin_{p1}$, $Bin_{p2}$ ... $Bin_{pi-1}$ and $Bin_{pi}$; there are j intervals in a range where the VSP is negative (represented by subscript n), which are defined as $Bin_{n1}$, $Bin_{n2}$, $Bin_{n3}$ ... $Bin_{nj-1}$ ... $Bin_{nj}$; each bin represents a VSP range in which the vehicle is traveling.

S103: Detect a vehicle speed and acceleration by a vehicle driving state tester of a detection system, calculate a VSP of a tested vehicle under a test cycle by Eq. (9), allocate the vehicle emission remote sensing test data to a corresponding bin according to the VSP, and perform statistical analysis on a vehicle emission remote sensing test result in each bin.

S104: Detect concentration ratios $\phi_{CO}$, $\phi_{HC}$ and $\phi_{NO}$ of CO, HC and $NO_x$ to $CO_2$ in an exhaust plume of the vehicle by a vehicle emission measuring instrument, and determine a combustion status of the vehicle engine and CO, HC and NO emission levels of the vehicle by the relative volume concentration ratios $\phi_{CO}$, $\phi_{HC}$ and $\phi N_{NO}$ of CO, HC and NO to $CO_2$.

S105: Calculate CO, HC and $NO_x$ emissions per unit mass of fuel (g/kg fuel) by the relative volume concentration ratios $\phi_{CO}$, $\phi_{HC}$ and $\phi_{NO}$ of CO, HC and NO to $CO_2$ and molecular weights of substances by Eq. (4) according to a carbon balance method, and determine an emission status of the tested vehicle in real time.

S106: Calculate emission concentrations of CO, HC, NO$_x$ and CO$_2$ in the exhaust plume of the vehicle by the concentration ratios $\phi_{CO}$, $\phi_{HC}$ and $\phi_{NO}$ of CO, HC, NO$_x$ and CO$_2$ in the exhaust plume by Eqs. (5), (6), (7) and (8), and determine the emission status of the tested vehicle in real time.

S107: Process the vehicle emission remote sensing test data in each VSP bin by using a probability distribution method for a discrete random variable: take a cumulative probability value of a vehicle indicated as emission compliance by a cumulative distribution probability according to a proportion of high-emission vehicles among the in-use vehicles, and determine a corresponding emission measurement value as a remote sensing determination threshold for screening high-emission vehicles.

S108: Perform statistical analysis of excess remote sensing emission measurement values of the vehicle; record the tested vehicle as one exceeding an emission limit if the remote sensing emission test result of the tested vehicle exceeds the high-emission determination threshold; if the number of excess emission records within a specified time period reaches a determination number, for example, if the vehicle's detection results of the same pollutant exceeds the high-emission determination threshold twice or more and the measurement interval is within 6 natural months, determine the tested vehicle as a high-emission vehicle, where in this case, an owner of the vehicle may be notified to repair the vehicle; if no repair is made, a travel restriction may be imposed on the vehicle.

S109: Evaluate an average emission level of the vehicle by using a statistical average value of emissions in each VSP bin. The statistical average value in each VSP bin is sufficient to represent the true emission of this type of vehicle in the bin, and can be used to evaluate the vehicle emission level and estimate the emission.

S110: Delete the excess emission data of a vehicle in a database after the vehicle passes an emission test after being repaired, and record the excess emission information of the vehicle separately to evaluate the emission levels of various types of vehicles on the market. Since the big data processing system continues to screen out a certain proportion of high-emission vehicles and corresponding rectification measures are adopted, the overall average emissions of in-use vehicles are reduced. Over time, low-emission vehicles are increased and old vehicles are eliminated, which constantly changes the composition of vehicle ownership. The big data of statistical analysis is updated in real time, and the mean and median values of the overall remote sensing emission data are updated simultaneously. This realizes the simultaneous update of the ownership composition of in-use vehicles with the overall average emission level of vehicles, and realizes the dynamic adjustment of the remote sensing determination threshold for screening high-emission vehicles. The high-emission determination threshold has the advantage of real-time updating compared with the annual emission inspection standard limits of in-use vehicles.

S11: Perform statistical analysis regularly on the excess emission records of vehicles in use by the vehicle emission monitoring platform, evaluate and rank the emission levels and emission control technology levels of all types of vehicles on the market, and focus the spot check and supervision of emissions on a vehicle type with a high proportion of excess emission records.

In overall, steps S101 to S111 involve the classification of vehicles equipped with ignition engines, the calculation of VSP, the remote sensing detection of gaseous exhaust pollutants of the vehicles, the statistical analysis of the big remote sensing test data of vehicle emissions, the determination of high-emission vehicles, the evaluation of the average emission level of vehicles and the screening and supervision of high-emission vehicle types.

Embodiment 2

1) Classify vehicles equipped with ignition engines into different types based on the volume of vehicle emission remote sensing test data and a need for refined management of different types of vehicles, as shown in FIG. 2. The vehicles equipped with ignition engines may be classified into light-duty vehicles, medium-duty vehicles and heavy-duty vehicles, and may be further classified into light-duty passenger vehicles, light-duty trucks, medium-duty passenger vehicles, medium-duty trucks, heavy-duty passenger vehicles and heavy-duty trucks. Ignition engines for heavy-duty vehicles rarely use gasoline engines, and often use natural gas engines or alcohol fuel engines.

2) Process with a big data statistical analysis method based on the emission remote sensing test results of light-duty passenger vehicles among vehicles equipped with ignition engines in Beijing, China.

The VSP distribution of the light-duty passenger vehicles among vehicles equipped with ignition engines in Beijing was calculated by a VSP calculation equation:

$$VSP = \left[\frac{C_D A_f}{m_v}\frac{\rho_a}{2}(v \pm v_w)^2 + gC_R \cos\varphi + a(1+\varepsilon_i) + g\sin\varphi\right]v \quad (9)$$

where, VSP represents vehicle specific power (kW/ton); $C_D$ represents a drag coefficient, dimensionless; $A_f$ represents a frontal area of the vehicle, in m$^2$; $\rho_a$ represents an air density, 1.29 kg/m$^3$; v represents a vehicle speed, in m/s; $v_w$ represents a wind speed, in m/s, positive when the wind direction is opposite to the travel direction of the vehicle and negative otherwise; g represents an acceleration due to gravity, 9.8 m·s$^{-2}$; $C_k$ represents a rolling resistance coefficient of a tire, dimensionless; a represents a vehicle acceleration, in m/s$^2$; $\varepsilon_i$ represents a mass conversion coefficient of a rotating part of a powertrain; $\varphi$ represents a road gradient; $m_v$ represents a vehicle mass, in ton.

Figure 5:
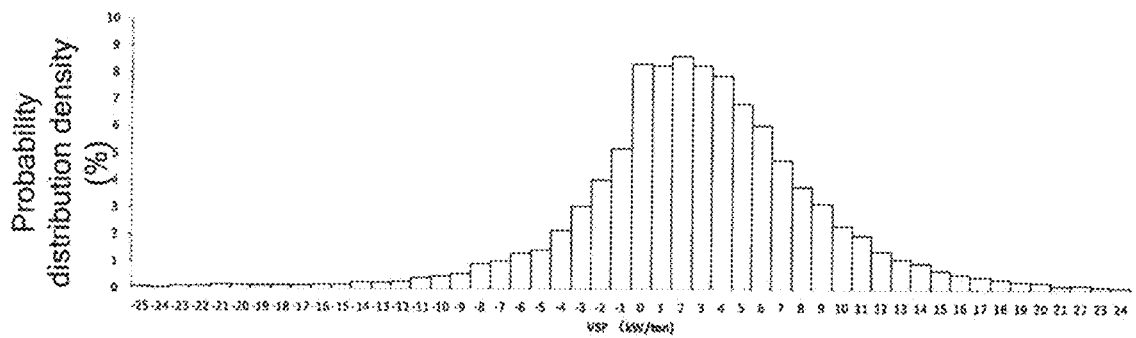
FIG. 5 shows a distribution probability of a VSP of light-duty passenger vehicles in Beijing of China according to the present disclosure.

Distribution probability statistics was performed on the calculated VSP values of the light-duty passenger vehicles equipped with ignition engines in Beijing, as shown in FIG. 5.

3) Divide the VSP into 24 bins (Table 1) so as to realize refined management. The VSP distribution of the light-duty passenger vehicles tend to increase towards the center and reduce towards both sides. The light-duty passenger vehicles have the highest probability density in the VSP of 0-5 kW/ton. Outside this range, whether the VSP increases or decreases, the probability of the vehicles appearing in this VSP bin in a driving cycle is reduced.

TABLE 1

| VSP bins of light-duty passenger vehicles equipped with ignition engines in Beijing | |
|---|---|
| Bin No. | VSP interval (kW/ton) |
| 1 | VSP < −15 |
| 2 | −15 ≤ VSP < −13 |
| 3 | −13 ≤ VSP < −11 |
| 4 | −11 ≤ VSP < −9 |
| 5 | −9 ≤ VSP < −7 |

TABLE 1-continued

VSP bins of light-duty passenger vehicles equipped with ignition engines in Beijing

| Bin No. | VSP interval (kW/ton) |
|---|---|
| 6 | −7 ≤ VSP < −5 |
| 7 | −5 ≤ VSP < −4 |
| 8 | −4 ≤ VSP < −3 |
| 9 | −3 ≤ VSP < −2 |
| 10 | −2 ≤ VSP < −1 |
| 11 | −1 ≤ VSP < 0 |
| 12 | 0 ≤ VSP < 1 |
| 13 | 1 ≤ VSP < 2 |
| 14 | 2 ≤ VSP < 3 |
| 15 | 3 ≤ VSP < 4 |
| 16 | 4 ≤ VSP < 5 |
| 17 | 5 ≤ VSP < 6 |
| 18 | 6 ≤ VSP < 7 |
| 19 | 7 ≤ VSP < 8 |
| 20 | 8 ≤ VSP < 9 |
| 21 | 9 ≤ VSP < 11 |
| 22 | 11 ≤ VSP < 13 |
| 23 | 13 ≤ VSP < 15 |
| 24 | 15 ≤ VSP |

In Table 1, the vehicle driving cycle is divided into multiple bins by using VSP as a parameter. Because the load of the vehicle engine varies in different bins, the CO, HC and $NO_x$ emissions in each bin are significantly different. In addition, due to the different configurations of the engine and transmission of each vehicle, the CO, HC and $NO_x$ emission characteristics of each vehicle type are also significantly different.

4) Perform remote sensing detection of exhaust pollutants of some vehicles equipped with ignition engines in the urban area of Beijing by a remote sensing detection system for vehicle exhaust pollutants; detect concentration ratios of CO, HC and NO to $CO_2$ from each vehicle, that is, $CO/CO_2$, $HC/CO_2$ and $NO/CO_2$; record vehicle license plate information; measure vehicle speed and acceleration as well as environmental information.

The relative volume concentration ratios of the gaseous emissions in the exhaust plume of the vehicle are:

$$\phi_{CO} = \frac{C_{CO}}{C_{CO_2}} \quad (1)$$

$$\phi_{HC} = \frac{C_{HC}}{C_{CO_2}} \quad (2)$$

$$\phi_{NO} = \frac{C_{NO}}{C_{CO_2}} \quad (3)$$

where, $\phi_{CO}$, $\phi_{HC}$ and $\phi_{NO}$ represent the relative volume concentration ratios of CO, HC and NO to $CO_2$ respectively; $C_{CO}$, $C_{HC}$, $C_{NO}$ and $C_{CO_2}$ represent concentrations of CO, HC, $NO_x$ and $CO_2$ in the exhaust plume respectively.

The emission status of the tested vehicle equipped with an ignition engine can be determined in real time by the concentration ratios $\phi_{CO}$, $\phi_{HC}$ and $\phi_{NO}$ of CO, HC and $NO_x$ to $CO_2$ in the exhaust plume of the vehicle.

5) Calculate CO, HC and NO emissions per unit mass of fuel consumed, (g/kg fuel).

According to a carbon balance method, the CO, HC and NO emissions per unit mass of fuel consumed by the vehicle are calculated as follows:

Take gasoline as an example, the molecule of gasoline is represented by $CH_2$ and its molar mass is 0.014 kg/mol, so the emission factors (EFs) of CO, HC and NO based on fuel mass can be calculated as follows:

$$EF_{CO} = \frac{28}{0.014} * \frac{\phi_{CO}}{1 + \phi_{CO} + 6 * \phi_{HC}} [\text{g/kg fuel}]$$

$$EF_{HC} = \frac{2*44}{0.014} * \frac{\phi_{HC}}{1 + \phi_{CO} + 6 * \phi_{HC}} [\text{g/kg fuel}]$$

$$EF_{NO} = \frac{30}{0.014} * \frac{\phi_{NO}}{1 + \phi_{CO} + 6 * \phi_{HC}} [\text{g/kg fuel}]$$

The emission status of the tested vehicle can be determined in real time by the CO, HC and NO emissions per unit mass of fuel consumed (g/kg fuel) by the vehicle equipped with an ignition engine.

6) Calculate absolute emission concentrations of CO, HC and NO in the exhaust plume of the vehicle equipped with an ignition engine as follows:

$$EC_{CO2} = \frac{42}{2.79 + 2\phi_{CO} + 1.21\phi_{HC} + \phi_{NO}} \quad (5)$$

The volume percent concentrations of CO, HC and NO in the exhaust plume are calculated as follows:

$$EC_{CO} = EC_{CO_2} * \phi_{CO} \quad (6)$$

$$EC_{HC} = EC_{CO_2} * \phi_{HC} \quad (7)$$

$$EC_{NO} = EC_{CO_2} * \phi_{NO} \quad (8)$$

Based on the above equations and measured relative volume concentration ratios of each component in the exhaust plume, true volume concentrations of gasoline vehicle exhaust emissions can be reversely calculated.

The emission status of the tested vehicle equipped with an ignition engine can be determined in real time by the remote sensing concentrations of CO, HC and NO in the exhaust plume of the vehicle.

Figure 6:
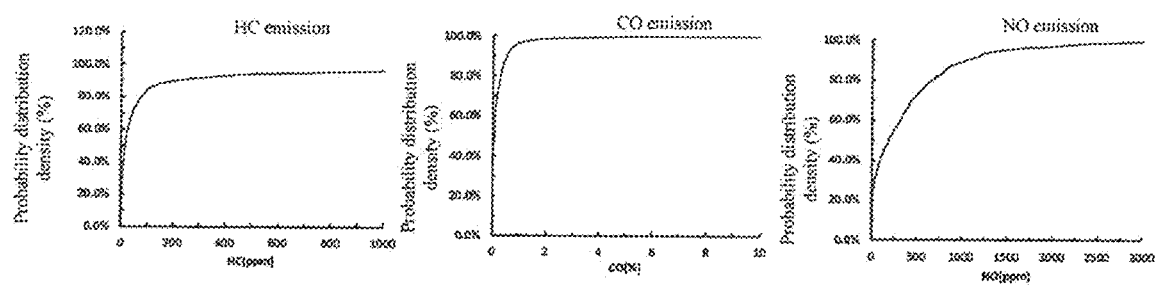
FIG. 6 shows a cumulative distribution probability curve of a remote sensing emission measurement value of light-duty passenger vehicles under an ASM5024 mode in Beijing of China according to the present disclosure.

6) Analysis on the big remote sensing data of emissions of light-duty passenger vehicles equipped with ignition engines The analysis was based on a large amount of data acquired in an acceleration simulation mode (ASM) test cycle of the light-duty passenger vehicles. The speed of the light-duty passenger vehicles equipped with ignition engines in Beijing under the ASM test cycle was 24 km/h, and the calculated VSP was 0.97 kW/ton. According to the VSP, the vehicle cycle parameters and remote sensing emission data are allocated in Bin12 of the VSP. The statistical analysis and processing of the remote sensing emission data are performed as follows:

This embodiment analyzes the cumulative distribution probability of the absolute concentrations of CO, HC and NO emissions measured by remote sensing with reference to the statistical analysis of the absolute concentrations of the CO, HC and NO emissions of the light-duty passenger vehicles equipped with ignition engines in Beijing under an ASM5024 cycle, as shown in FIG. 6.

Figure 3:
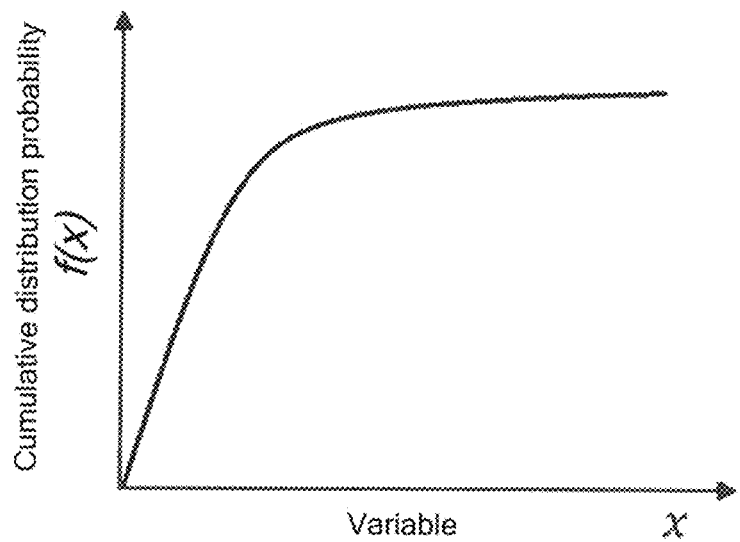
FIG. 3 is a schematic diagram of a cumulative distribution density function $f(x)$ of an emission data variable x according to the present disclosure.
Figure 4:
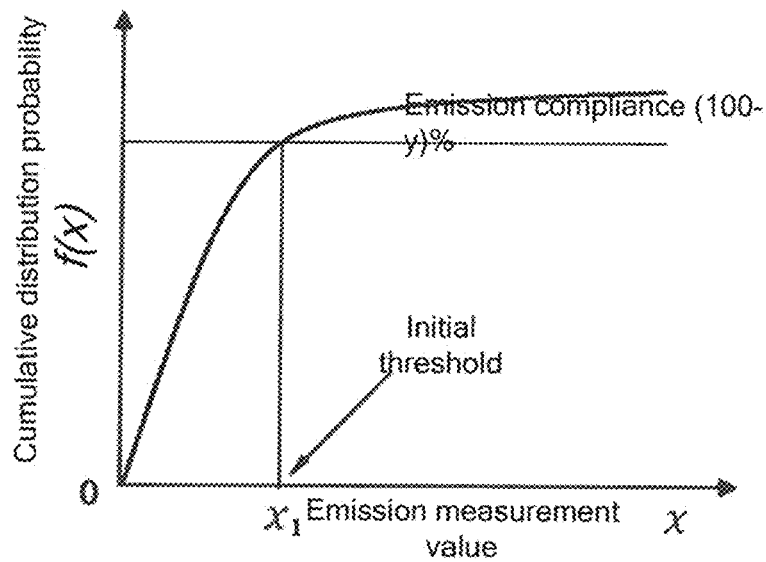
FIG. 4 is a schematic diagram of a method for determining a high-emission determination threshold according to a cumulative distribution probability of the emission data variable x according to the present disclosure.

7) Selection and analysis on the high-emission threshold of light-duty passenger vehicles equipped with ignition engines According to a cumulative distribution probability curve of remote sensing emission measurement values of the light-duty passenger vehicles equipped with ignition engines in Beijing under an ASM5024 mode, the high-emission vehicle screening threshold for the light-duty passenger vehicles equipped with ignition engines in Beijing under the ASM mode was analyzed, as shown in FIG. 3.

TABLE 3

Analysis on the high-emission vehicle screening threshold for light-duty passenger vehicles equipped with ignition engines in Beijing under an ASM cycle

| Emissions | Remote sensing emission data under ASM mode | | Remote sensing emission data with 5% high-emission vehicles screened | | Remote sensing emission data with 15% high-emission vehicles screened | |
|---|---|---|---|---|---|---|
| | Maximum value | Statistical average value | Maximum value | Statistical average value | Maximum value | Statistical average value |
| HC (ppm) | 9886 | 169.26 | 735 | 47.7 | 107 | 21.44 |
| CO (%) | 12.77 | 0.23 | 0.82 | 0.14 | 0.39 | 0.091 |
| NO (ppm) | 3968 | 396.62 | 1425.2 | 302.48 | 815 | 212.70 |

Due to the high rate of misjudgment in the current vehicle remote sensing test, the remote sensing test only screens 5% of high-emission vehicles. In this embodiment, the analysis is carried out with the goal of individually controlling one exhaust pollutant. The emission measurement value with a cumulative distribution probability of 95% is taken from the cumulative probability distribution curve of each pollutant as an initial emission limit, that is, as the remote sensing determination threshold for screening high-emission vehicles. If the remote sensing test value of a vehicle exceeds the high-emission vehicle screening threshold in the bin, the vehicle is recorded as exceeding the emission limit. The emission remote sensing test data and statistical analysis results in each bin are always in a dynamic update process, but for the convenience of analysis, they are handled as static temporarily.

If the individual control of CO emission is the goal and 5% of high-emission vehicles are screened, the remote sensing emission determination threshold for high-emission vehicles is 0.82%. When the determined high-emission vehicles meet the emission limit after maintenance, with the 5% high-emission vehicles screened, the CO emission is reduced from the maximum value of 12.77% to 0.82%, and the statistical average value of the CO emission is reduced from 0.23% to 0.14%.

If the individual control of NO emission is the goal and 5% of high-emission vehicles are screened, the remote sensing emission determination threshold for high-emission vehicles is 1425.2 ppm. When the determined high-emission vehicles meet the emission limit after maintenance, with the 5% high-emission vehicles screened, the NO emission is reduced from the maximum value of 3968 ppm to 1425.2 ppm, and the statistical average value of the NO emission is reduced from 396.62 ppm to 302.48 ppm.

If the individual control of HC emission is the goal and 5% of high-emission vehicles are screened, the remote sensing emission determination threshold for high-emission vehicles is 735 ppm. When the determined high-emission vehicles meet the emission limit after maintenance, with the 5% high-emission vehicles screened, the HC emission is reduced from the maximum value of 9886 ppm to 735 ppm and the statistical average value of the HC emission is reduced from 169.26 ppm to 47.7 ppm.

The emission remote sensing test value of each vehicle is composed of a set of data (CO, HC and NO emissions). There is a situation in which one pollutant exceeds the emission limit while the other two meet the emission limit, two pollutants exceed the emission limit while the other one meets the emission limit or all the three pollutants exceed the emission limit. Therefore, if the CO, HC and NO emissions of a vehicle are screened according to the 5% high-emission vehicle determination threshold, and when one of them exceeds the emission limit, the vehicle is determined as a high-emission vehicle, the actual proportion of high-emission vehicles screened is greater than 5%. If a vehicle is determined as a high-emission vehicle only when the three pollutants all exceed the emission limit, the actual proportion of high-emission vehicles screened is less than 5%. Therefore, it is necessary to appropriately adjust the determination thresholds of the three exhaust pollutants for high-emission vehicles through subsequent tests, so that the proportion of high-emission vehicles actually screened is controlled to 5%.

Table 3 shows that in accordance with the determination principle of the emission limit in the revision standard of in-use vehicles, the proportion of high-emission vehicles is set between 10% and 20%. If, taking 15% as an example, the emission measurement value corresponding to the cumulative distribution probability of 85% is taken as the remote sensing emission determination threshold for screening high-emission vehicles, the emission control effect will be more significant.

8) Determination of high-emission light-duty passenger vehicles equipped with ignition engines If the remote sensing test value of a vehicle exceeds the high-emission vehicle screening threshold in each VSP bin, this vehicle is recorded as exceeding the emission limit.

If the number of excess emission records reaches a determination number within a specified time period, for example, referring to the HJ 845-2017 standard, the remote sensing test values of the same pollutant exceed the emission limit specified by the standard twice or more and the measurement interval is within 6 natural months, the tested vehicle is determined unqualified and as a high-emission vehicle. The owner of the tested vehicle may be notified to repair the vehicle, and if no repair is made, a travel restriction may be imposed.

When the vehicle passes an emission test after being repaired, the excess emission data of the vehicle is deleted from the database, and recorded separately for comprehensive evaluation of the emission levels of various types of vehicles.

9) Comprehensive evaluation of emission levels of various types of vehicles in use The vehicle emission monitoring platform regularly counts the excess emission records of various types of vehicles, and ranks and evaluates the number of excess emissions records and emission levels of all types of vehicles on the market. The spot check and supervision of emissions focuses on a vehicle type with a high proportion of excess emission records.

10) Statistical average value of emission in each bin

The statistical average value of the remote sensing monitoring data in the VSP bin of each vehicle may be calculated by a discrete random variable equation:

$$\bar{x} = \Sigma_{i=1}^{n} x_i p_i.$$

The statistical average of remote sensing monitoring data is the weighted average of all data, which considers not only the value of each remote sensing monitoring data, but also the corresponding probability of the value.

As time accumulates, the volume of the remote sensing test data stored in each bin increases rapidly. Due to the use of the probability and statistical analysis methods, the huge number of remote sensing test results no longer becomes a difficulty or obstacle to solving the problem, but instead becomes a guarantee that the statistical average has practical significance. The fluctuation of the random emission test results around the statistical average has a negligible impact on the statistical average of each bin. Therefore, the statistical average value of each bin is sufficient to represent the true emission value of this type of vehicle in the bin under the driving cycle, and can be used for vehicle emission level evaluation and emission estimation.

As the remote sensing monitoring data increases, data statistics and analysis are updated in real time. This method can always screen out a certain proportion of high-emission vehicles, and corresponding rectification measures are adopted, which reduces the overall average emissions of the vehicles. Over time, as low-emission vehicles are increased and old vehicles are eliminated, the composition of vehicle ownership is changing. Due to the real-time update of the statistical analysis of the data, the remote sensing emission determination threshold for screening high-emission vehicles is dynamically adjusted, changing simultaneously with the average emission levels of vehicles and the composition of vehicle ownership. The high-emission determination threshold has the advantage of real-time updating compared with the annual emission inspection standard limits of in-use vehicles, which are restricted by the cycle and process of standard formulation and revision.

Each embodiment in the specification of the present disclosure is described in a progressive manner. Each embodiment focuses on the difference from other embodiments, and the same and similar parts between the embodiments may refer to each other. For a device disclosed in the embodiments, since it corresponds to the method disclosed in the embodiments, the description is simple, and reference can be made to the method description.

The above illustration of the disclosed embodiments makes it possible for a person skilled in the art to implement or practice the present disclosure. Various modifications to these embodiments will be obvious to those skilled in the art, and the general principles defined in this present disclosure may be implemented in other embodiments without departing from the spirit or scope of the present disclosure. Thus, the present disclosure is not limited to the embodiments shown herein but falls within the widest scope consistent with the principles and novel features disclosed herein.

What is claimed is:

1. A method for detecting exhaust emissions of a vehicle equipped with an ignition engine based on big data of remote sensing, comprising:
   S1: performing remote sensing detection on gaseous exhaust pollutants of a vehicle;
   S2: calculating a VSP and dividing the VSP into bins;
   S3: performing statistical analysis on exhaust pollutant data in each bin divided in S2 according to exhaust pollutant data obtained in S1 and information of bins divided in S2;
   S4: calculating an average emission level of the vehicle; and
   S5: determining a high-emission vehicle;
   wherein the determining a high-emission vehicle comprises:
   recording a tested vehicle as one exceeding an emission limit if a remote sensing emission test result of the tested vehicle exceeds a high-emission determination threshold in a bin, and recording the tested vehicle as a high-emission vehicle if the number of the vehicle's excess emission records reaches a determination number within a specified time period.

2. The method for detecting exhaust emissions of a vehicle equipped with an ignition engine based on big data of remote sensing according to claim 1, wherein the performing remote sensing detection on gaseous exhaust pollutants of a vehicle in S1 comprises:
   1) detecting relative volume concentration ratios of CO, HC and NO to $CO_2$ in an exhaust plume respectively, that is, $CO/CO_2$, $HC/CO_2$ and $NO/CO_2$, or $\phi_{CO}$, $\phi_{HC}$ and $\phi_{NO}$:

$$\phi_{CO} = \frac{C_{CO}}{C_{CO_2}} \quad (1)$$

$$\phi_{HC} = \frac{C_{HC}}{C_{CO_2}} \quad (2)$$

$$\phi_{NO} = \frac{C_{NO}}{C_{CO_2}} \quad (3)$$

wherein, $\phi_{CO}$, $\phi_{HC}$ and $\phi_{NO}$ represent the relative volume concentration ratios of CO, HC and NO to $CO_2$ respectively; $C_{CO}$, $C_{HC}$, $C_{NO}$ and $C_{CO_2}$ represent concentrations of CO, HC, $NO_x$ and $CO_2$ in the exhaust plume respectively;

2) calculating an emission of pollutant P per unit mass of fuel consumed by the vehicle, that is, an emission factor per mass by using a carbon balance method according to the relative volume concentration ratios of each component in the exhaust plume calculated in 1):

$$EF_P = \frac{M_P}{M_{fuel}} * \frac{\phi_P}{1 + \phi_{CO} + 6*\phi_{HC}} [\text{g/kg fuel}] \quad (4)$$

wherein, P represents CO, HC and NO; $M_p$ and $M_{fuel}$ represent a molecular weight of pollutant P and fuel respectively, in g/mole;

3) calculating volume percent concentrations of $CO_2$, CO, HC and NO in the exhaust plume of the vehicle according to the relative volume concentration ratios of each component in the exhaust plume calculated in 1):

$$EC_{CO2} = \frac{42}{2.79 + 2\phi_{CO} + 1.21\phi_{HC} + \phi_{NO}} \quad (5)$$

$$EC_{CO} = EC_{CO_2} * \phi_{CO} \quad (6)$$

$$EC_{HC} = EC_{CO_2} * \phi_{HC} \quad (7)$$

$$EC_{NO} = EC_{CO_2} * \phi_{NO} \quad (8).$$

3. The method for detecting exhaust emissions of a vehicle equipped with an ignition engine based on big data of remote sensing according to claim 1, wherein based on a volume of emission remote sensing data and a need for refined management, vehicles equipped with ignition engines are classified into light-duty vehicles, medium-duty vehicles and heavy-duty vehicles according to a gross vehicle mass (GVM), and are further classified into light-duty passenger vehicles, light-duty trucks, medium-duty passenger vehicles, medium-duty trucks, heavy-duty passenger vehicles and heavy-duty trucks according to their uses.

4. The method for detecting exhaust emissions of a vehicle equipped with an ignition engine based on big data of remote sensing according to claim 3, wherein the calculating a VSP and dividing the VSP into bins in S2 specifically comprises:

calculating a VSP:

$$VSP = \left[\frac{C_D A_f}{m_v} \frac{\rho_a}{2}(v \pm v_w)^2 + gC_R \cos\varphi + a(1+\varepsilon_i) + g\sin\varphi\right]v \quad (9)$$

wherein, $C_D$ represents a drag coefficient; $A_f$ represents a frontal area of the vehicle; $\rho_a$ represents an air density; v represents a vehicle speed; $v_w$ represents a wind speed; g represents an acceleration due to gravity; $C_R$ represents a rolling resistance coefficient of a tire; a represents a vehicle acceleration; $\varepsilon_i$ represents a mass conversion coefficient of a rotating part of a powertrain; $\varphi$ represents a road gradient; $m_v$ represents a vehicle mass;

dividing a driving cycle of each type of vehicles into i+j intervals using the VSP as a parameter, wherein there are i intervals in a range where the VSP is positive, which are respectively defined as $Bin_{p1}$、 $Bin_{p2}$、、$Bin_{pi-1}$、$Bin_{pi}$; there are j intervals in a range where the VSP is negative, which are defined as $Bin_{n1}$、$Bin_{n2}$、、$Bin_{ni-1}$、$Bin_{ni}$; each bin represents a VSP range in which the vehicle is traveling.

5. The method for detecting exhaust emissions of a vehicle equipped with an ignition engine based on big data of remote sensing according to claim 4, wherein the performing statistical analysis specifically comprises:

S31: detecting a vehicle speed and acceleration by a vehicle driving state tester, calculating the VSP of the tested vehicle under a test cycle by Eq. (9), and allocating vehicle emission remote sensing test data to a corresponding bin according to the VSP; and S32: processing the vehicle emission remote sensing test data in each VSP bin by using a probability distribution method for a discrete random variable:

taking the vehicle remote sensing emission data as a discrete random variable x, letting $x_1, x_2, \ldots, x_n$ be values of the remote sensing emission data variable x and $p_1, p_2, \ldots, p_n$ be probabilities corresponding to these values, which indicate a probability distribution density, wherein, the probability distribution of discrete remote sensing detection data $x_i$ may be expressed as:

$$P(x_i) = p_i \quad (10)$$

wherein, i=1, 2, . . . , n,
probability $p_i$ satisfies:

$$\Sigma_{i=1}^n p_i = 1 \quad (11)$$

deriving a cumulative distribution probability of the discrete emission data variable x by a cumulative distribution function $f(x)$:

$$f(x_i) = \Sigma_1^i p_i \quad (12)$$

calculating a probability of a value of the discrete emission data variable x that falls within [a,b]:

$$P(a < x \leq b) = f(b) - f(a) \quad (13)$$

wherein, the values of the emission data variable $x_i$ are greater than or equal to 0, and a cumulative distribution probability curve of the probability distribution function $f(x)$ of the emission data variable x is thus obtained; the emission data variable $x_i$ is regarded as coordinates of random points on a coordinate axis, and values of cumulative distribution probability function $f(x_i)$ represent the probabilities of x falling in the interval (0~$x_i$); if a proportion of high-emission vehicles is set at y %, an emission measurement value with a cumulative distribution probability of (100−y) % is taken as an initial emission limit or an emission determination threshold for screening high-emission vehicles.

6. The method for detecting exhaust emissions of a vehicle equipped with an ignition engine based on big data of remote sensing according to claim 5, wherein the average emission level of the vehicle is calculated by:

$$\bar{x} = \Sigma_{i=1} x_i p_i \quad (14).$$

7. A detection system based on the method for detecting exhaust emissions of a vehicle equipped with an ignition engine based on big data of remote sensing according to claim 1, comprising: a vehicle emission measuring instrument (1), a host computer (2), an information display instrument (3), a vehicle driving state tester (4), a weather monitor (5), a license plate camera (6) and a vehicle emission monitoring platform (7), wherein the vehicle emission measuring instrument (1), the information display instrument (3), the vehicle driving state tester (4), the weather monitor (5) and the license plate camera (6) communicate with the host computer (2); the host computer (2) is connected to the vehicle emission monitoring platform (7) via the Internet;

the host computer (2) is used to process data acquired by the vehicle emission measuring instrument (1), the vehicle driving state tester (4), the weather monitor (5) and the license plate camera (6).

8. A detection system based on the method for detecting exhaust emissions of a vehicle equipped with an ignition engine based on big data of remote sensing according to claim 2, comprising: a vehicle emission measuring instrument (1), a host computer (2), an information display instrument (3), a vehicle driving state tester (4), a weather monitor (5), a license plate camera (6) and a vehicle emission monitoring platform (7), wherein the vehicle emission measuring instrument (1), the information display instrument (3), the vehicle driving state tester (4), the weather monitor (5) and the license plate camera (6) communicate with the host computer (2); the host computer (2) is connected to the vehicle emission monitoring platform (7) via the Internet;

the host computer (2) is used to process data acquired by the vehicle emission measuring instrument (1), the vehicle driving state tester (4), the weather monitor (5) and the license plate camera (6).

9. A detection system based on the method for detecting exhaust emissions of a vehicle equipped with an ignition engine based on big data of remote sensing according to claim 3, comprising: a vehicle emission measuring instrument (1), a host computer (2), an information display instrument (3), a vehicle driving state tester (4), a weather monitor (5), a license plate camera (6) and a vehicle emission monitoring platform (7), wherein the vehicle emission measuring instrument (1), the information display instrument (3), the vehicle driving state tester (4), the weather monitor (5) and the license plate camera (6) communicate with the host computer (2); the host computer (2) is connected to the vehicle emission monitoring platform (7) via the Internet;

the host computer (2) is used to process data acquired by the vehicle emission measuring instrument (1), the vehicle driving state tester (4), the weather monitor (5) and the license plate camera (6).

10. A detection system based on the method for detecting exhaust emissions of a vehicle equipped with an ignition engine based on big data of remote sensing according to claim 4, comprising: a vehicle emission measuring instrument (1), a host computer (2), an information display instrument (3), a vehicle driving state tester (4), a weather monitor (5), a license plate camera (6) and a vehicle emission monitoring platform (7), wherein the vehicle emission measuring instrument (1), the information display instrument (3), the vehicle driving state tester (4), the weather monitor (5) and the license plate camera (6) communicate with the host computer (2); the host computer (2) is connected to the vehicle emission monitoring platform (7) via the Internet;

the host computer (2) is used to process data acquired by the vehicle emission measuring instrument (1), the vehicle driving state tester (4), the weather monitor (5) and the license plate camera (6).

11. A detection system based on the method for detecting exhaust emissions of a vehicle equipped with an ignition engine based on big data of remote sensing according to claim 5, comprising: a vehicle emission measuring instrument (1), a host computer (2), an information display instrument (3), a vehicle driving state tester (4), a weather monitor (5), a license plate camera (6) and a vehicle emission monitoring platform (7), wherein the vehicle emission measuring instrument (1), the information display instrument (3), the vehicle driving state tester (4), the weather monitor (5) and the license plate camera (6) communicate with the host computer (2); the host computer (2) is connected to the vehicle emission monitoring platform (7) via the Internet;

the host computer (2) is used to process data acquired by the vehicle emission measuring instrument (1), the vehicle driving state tester (4), the weather monitor (5) and the license plate camera (6).

12. A detection system based on the method for detecting exhaust emissions of a vehicle equipped with an ignition engine based on big data of remote sensing according to claim 6, comprising: a vehicle emission measuring instrument (1), a host computer (2), an information display instrument (3), a vehicle driving state tester (4), a weather monitor (5), a license plate camera (6) and a vehicle emission monitoring platform (7), wherein the vehicle emission measuring instrument (1), the information display instrument (3), the vehicle driving state tester (4), the weather monitor (5) and the license plate camera (6) communicate with the host computer (2); the host computer (2) is connected to the vehicle emission monitoring platform (7) via the Internet;

the host computer (2) is used to process data acquired by the vehicle emission measuring instrument (1), the vehicle driving state tester (4), the weather monitor (5) and the license plate camera (6).

13. The system for detecting exhaust emissions of a vehicle equipped with an ignition engine based on big data of remote sensing according to claim 7, wherein the vehicle emission measuring instrument (1) adopts a vertical or horizontal optical path and is disposed in a passing area of a vehicle;

the vehicle emission measuring instrument (1) comprises a detection light emitting device, a detection light receiving device and a detection light reflecting device; the detection light emitting device and the detection light receiving device are arranged oppositely; the detection light emitting device is used to emit detection light to pass through an exhaust plume; the detection light receiving device is used to receive the detection light passing through the exhaust plume;

the vehicle driving state tester (4) is an optical or radar measuring instrument for vehicle speed and acceleration.

14. The system for detecting exhaust emissions of a vehicle equipped with an ignition engine based on big data of remote sensing according to claim 8, wherein the vehicle emission measuring instrument (1) adopts a vertical or horizontal optical path and is disposed in a passing area of a vehicle;

the vehicle emission measuring instrument (1) comprises a detection light emitting device, a detection light receiving device and a detection light reflecting device; the detection light emitting device and the detection light receiving device are arranged oppositely; the detection light emitting device is used to emit detection light to pass through an exhaust plume; the detection light receiving device is used to receive the detection light passing through the exhaust plume;

the vehicle driving state tester (4) is an optical or radar measuring instrument for vehicle speed and acceleration.

15. The system for detecting exhaust emissions of a vehicle equipped with an ignition engine based on big data of remote sensing according to claim 9, wherein the vehicle emission measuring instrument (1) adopts a vertical or horizontal optical path and is disposed in a passing area of a vehicle;

the vehicle emission measuring instrument (1) comprises a detection light emitting device, a detection light receiving device and a detection light reflecting device; the detection light emitting device and the detection light receiving device are arranged oppositely; the detection light emitting device is used to emit detection light to pass through an exhaust plume; the detection light receiving device is used to receive the detection light passing through the exhaust plume;

the vehicle driving state tester (4) is an optical or radar measuring instrument for vehicle speed and acceleration.

16. The system for detecting exhaust emissions of a vehicle equipped with an ignition engine based on big data of remote sensing according to claim 7, wherein the information display instrument (3) is a high-brightness lattice screen, which is used to display relevant information of a tested vehicle in real time, comprising license plate number, vehicle speed and exhaust pollutant concentration;

the weather monitor is a miniature weather station (5), which is disposed in the passing area of the vehicle and is used to measure environmental parameters.

17. A method for detecting exhaust emissions of a vehicle equipped with an ignition engine based on big data of remote sensing, comprising:

acquiring multiple VSPs of a vehicle;

dividing the multiple VSPs into different bins;

acquiring vehicle gaseous exhaust pollutant data in each bin by using a remote sensing detection method;

deriving a high-emission determination threshold for each bin based on the vehicle gaseous exhaust pollutant data in each bin; and performing excess emission determination in each bin of a vehicle to be tested according to the high-emission determination threshold of each bin.

18. The method for detecting exhaust emissions of a vehicle equipped with an ignition engine based on big data of remote sensing according to claim 17, wherein the performing excess emission determination in each bin of a vehicle to be tested according to the high-emission determination threshold of each bin specifically comprises:

acquiring the gaseous exhaust pollutant data of the vehicle to be tested;

calculating the VSP of the vehicle to be tested;

determining a bin for the vehicle to be tested based on the VSP thereof;

recording the vehicle to be tested as one exceeding an emission limit if the gaseous exhaust pollutant data of the vehicle to be tested exceeds the high-emission determination threshold in the bin of the vehicle to be tested, and determining the vehicle to be tested as a high-emission vehicle if the number of excess emission records within a specified time period reaches a determination number.

* * * * *